No. 762,593. PATENTED JUNE 14, 1904.
G. D. LEXNER.
TRACE FASTENING.
APPLICATION FILED NOV. 5, 1903.
NO MODEL.

WITNESSES:
Wm H Bates
L. B. Middleton

INVENTOR
George D. Lexner.
BY
Herbert W. Jenner.
Attorney

No. 762,593. Patented June 14, 1904.

UNITED STATES PATENT OFFICE.

GEORGE D. LEXNER, OF LEXINGTON, MASSACHUSETTS.

TRACE-FASTENING.

SPECIFICATION forming part of Letters Patent No. 762,593, dated June 14, 1904.

Application filed November 5, 1903. Serial No. 179,918. (No model.)

*To all whom it may concern:*

Be it known that I, GEORGE D. LEXNER, a citizen of the United States, residing at Lexington, in the county of Middlesex and State of Massachusetts, have invented certain new and useful Improvements in Trace-Fastenings; and I do hereby declare the following to be a full, clear, and exact description of the invention, such as will enable others skilled in the art to which it appertains to make and use the same.

This invention relates to devices for fastening or attaching traces to vehicle-bodies; and it consists in the novel construction and combination of the parts hereinafter fully described and claimed.

Figure 1:
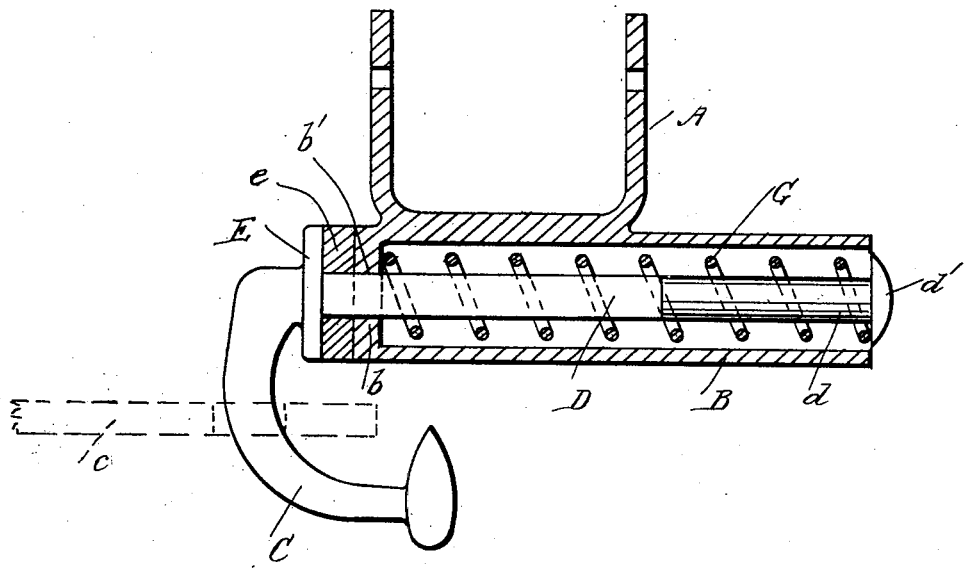
Figure 2:
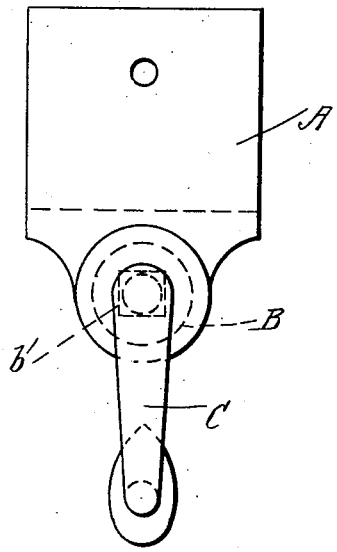

In the drawings, Figure 1 is a longitudinal section through the fastening device. Fig. 2 is an end view of the same.

A is a forked bracket, which is secured to any convenient part of the vehicle-shafts, such as the cross-bar, by bolts or screws, and B is a tubular guide which is formed on the lower part of the said bracket, and provided with a head $b$ at one end, which has a rectangular guide-hole $b'$ in it.

C is a hook which engages with the end portion $c$ of a trace, and which is provided with a rectangular shank D, which is slidable in the guide-hole $b'$.

E is a shoulder on the shank close to the hook, and $e$ is a collar or buffer of india-rubber arranged next to the said shoulder and between it and the head $b$. The end portion $d$ of the shank is preferably cylindrical, and $d'$ is a head or nut on the end of the said cylindrical portion.

G is a spiral spring inserted in the tubular guide between the heads $b$ and $d'$.

The usual whiffletree is dispensed with and the shank of the hook slides back and forth in the guide. The india-rubber buffer prevents the device making a noise when the shoulder of the hook strikes the head of the guide.

What I claim is—

1. In a trace-fastening, the combination, with a tubular guide provided with a head having a rectangular guide-hole and having also means for securing it to the shafts of a vehicle, of a draft attachment for engaging with the trace provided with a rectangular shank which is slidable in the said guide-hole, said shank having also a head, and a spring arranged in the said guide between the said heads.

2. In a trace-fastening, the combination, with a tubular guide provided at one end with a head having a rectangular guide-hole and having also means for securing it to the shafts of a vehicle, of a hook for engaging with the trace provided with a shoulder and a rectangular shank which is slidable in the said guide-hole, said shank having also a head at one end, a buffer of elastic material between the said shoulder and the head of the guide, and a spring arranged in the said guide between the said heads.

In testimony whereof I affix my signature in presence of two witnesses.

GEORGE D. LEXNER.

Witnesses:
 ALICE J. MURRAY,
 FREDERICK K. DAGGETT.